United States Patent
Maruyama

(10) Patent No.: US 12,409,895 B2
(45) Date of Patent: Sep. 9, 2025

(54) LOWER VEHICLE-BODY STRUCTURE

(71) Applicant: HONDA MOTOR CO., LTD., Tokyo (JP)

(72) Inventor: Atsushi Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 18/075,973

(22) Filed: Dec. 6, 2022

(65) Prior Publication Data

US 2023/0202578 A1 Jun. 29, 2023

(30) Foreign Application Priority Data

Dec. 28, 2021 (JP) ................................. 2021-213756

(51) Int. Cl.
*B62D 25/20* (2006.01)
*B62D 21/15* (2006.01)

(52) U.S. Cl.
CPC ......... *B62D 25/2009* (2013.01); *B62D 25/20* (2013.01); *B62D 25/2036* (2013.01); *B62D 21/157* (2013.01)

(58) Field of Classification Search
CPC ...... B62D 25/20; B62D 25/025; B62D 25/04; B62D 25/2009; B62D 25/2036; B62D 21/157
USPC ........................ 296/193.07, 209, 204, 203.03
See application file for complete search history.

(56) References Cited

U.S. PATENT DOCUMENTS

| | | | |
|---|---|---|---|
| 6,926,352 B2 * | 8/2005 | Gotou | B62D 25/2036 296/193.08 |
| 9,764,775 B2 * | 9/2017 | Daigaku | B62D 25/2036 |
| 9,873,457 B2 * | 1/2018 | Onishi | B62D 21/157 |
| 10,124,834 B2 | 11/2018 | Saeki | |
| 10,399,607 B2 * | 9/2019 | Sasakura | B62D 25/2018 |
| 10,988,178 B2 * | 4/2021 | Ohba | B62D 25/2045 |

FOREIGN PATENT DOCUMENTS

JP 6311679 B2 4/2018

* cited by examiner

*Primary Examiner* — Dennis H Pedder
(74) *Attorney, Agent, or Firm* — Rankin, Hill & Clark LLP

(57) ABSTRACT

A lower vehicle-body structure includes: a floor cross member coupling a side sill disposed on an outer side in a vehicle width direction of a vehicle body to a floor tunnel disposed in a center in the vehicle width direction of the vehicle body, and disposed so as to be held between seat brackets in a vehicle front-rear direction; and a tunnel reinforcing member provided in the floor tunnel, wherein the tunnel reinforcing member includes a first tunnel reinforcing member disposed at a position to overlap in the vehicle front-rear direction with the floor cross member, and second tunnel reinforcing members disposed at positions to overlap in the vehicle width direction at least partly with the seat bracket, and the seat brackets are coupled to the floor cross member.

7 Claims, 13 Drawing Sheets

LOWER VEHICLE-BODY STRUCTURE

CROSS-REFERENCE TO RELATED APPLICATION

The present application claims the benefit of priority to Japanese Patent Application No. 2021-213756 filed on Dec. 28, 2021, the disclosures of all of which are hereby incorporated by reference in their entireties.

TECHNICAL FIELD

Field of the Invention

The present invention relates to a lower vehicle-body structure of a vehicle such as an automobile.

Related Art

Japanese Patent No. 6311679 (referred to as Patent Document 1 hereinbelow) discloses a lower vehicle-body structure, having an H-shaped structure in a planar view, to include a pair of seat reinforcing members disposed along a side sill and a floor tunnel, and a single floor cross member coupling the pair of seat reinforcing members with each other.

In addition, the lower vehicle-body structure disclosed in Patent Document 1 includes a plurality of tunnel reinforcing members (tunnel cross members) disposed inside the floor tunnel at positions to overlap the seat reinforcing members in a side view along a vehicle width direction. The lower vehicle-body structure disclosed in Patent Document 1 prevents the floor tunnel from being deformed at a time of side collision, with the tunnel reinforcing members.

SUMMARY OF THE INVENTION

However, the lower vehicle-body structure disclosed in Patent Document 1 has a structure in which ends of the floor cross member are abutted on and coupled to substantially the centers of the seat reinforcing members, so that there is a risk that the seat reinforcing members themselves may be deformed when a side collision load is applied, to have seats themselves, attached to the seat reinforcing members, damaged.

The present invention is made in view of the aforementioned problem and is intended to provide a lower vehicle-body structure capable of preventing a floor panel region including a floor tunnel from being deformed.

In addition, the present invention is intended to provide a lower vehicle-body structure capable of improving rigidity of a lower portion of a vehicle body, to enhance safety at a time of collision.

To achieve this objective, the present invention provides a lower vehicle-body structure including: a floor cross member coupling a side sill disposed on an outer side in a vehicle width direction of a vehicle body to a floor tunnel disposed in a center in the vehicle width direction of the vehicle body, and disposed so as to be held between seat brackets in a vehicle front-rear direction; and a tunnel reinforcing member provided in the floor tunnel, wherein the tunnel reinforcing member includes a first tunnel reinforcing member disposed at a position to overlap in the vehicle front-rear direction with the floor cross member, and second tunnel reinforcing members disposed at positions to overlap in the vehicle width direction at least partly with the seat bracket, and the seat brackets are coupled to the floor cross member.

The present invention provides a lower vehicle-body structure capable of preventing a floor panel region including a floor tunnel from being deformed, to enhance safety at a time of collision.

In addition, the present invention provides a lower vehicle-body structure capable of improving rigidity of a lower portion of a vehicle body.

DESCRIPTION OF THE EMBODIMENTS

Next, a description is given in detail of an embodiment of the present invention, with reference to the drawings as appropriate. In each drawing, "front-rear" refers to a vehicle front-rear direction, "right-left" refers to a vehicle width direction (right-left direction), and "up-down" refers to a vehicle up-down direction (vertically up-down direction).

Figure 1:
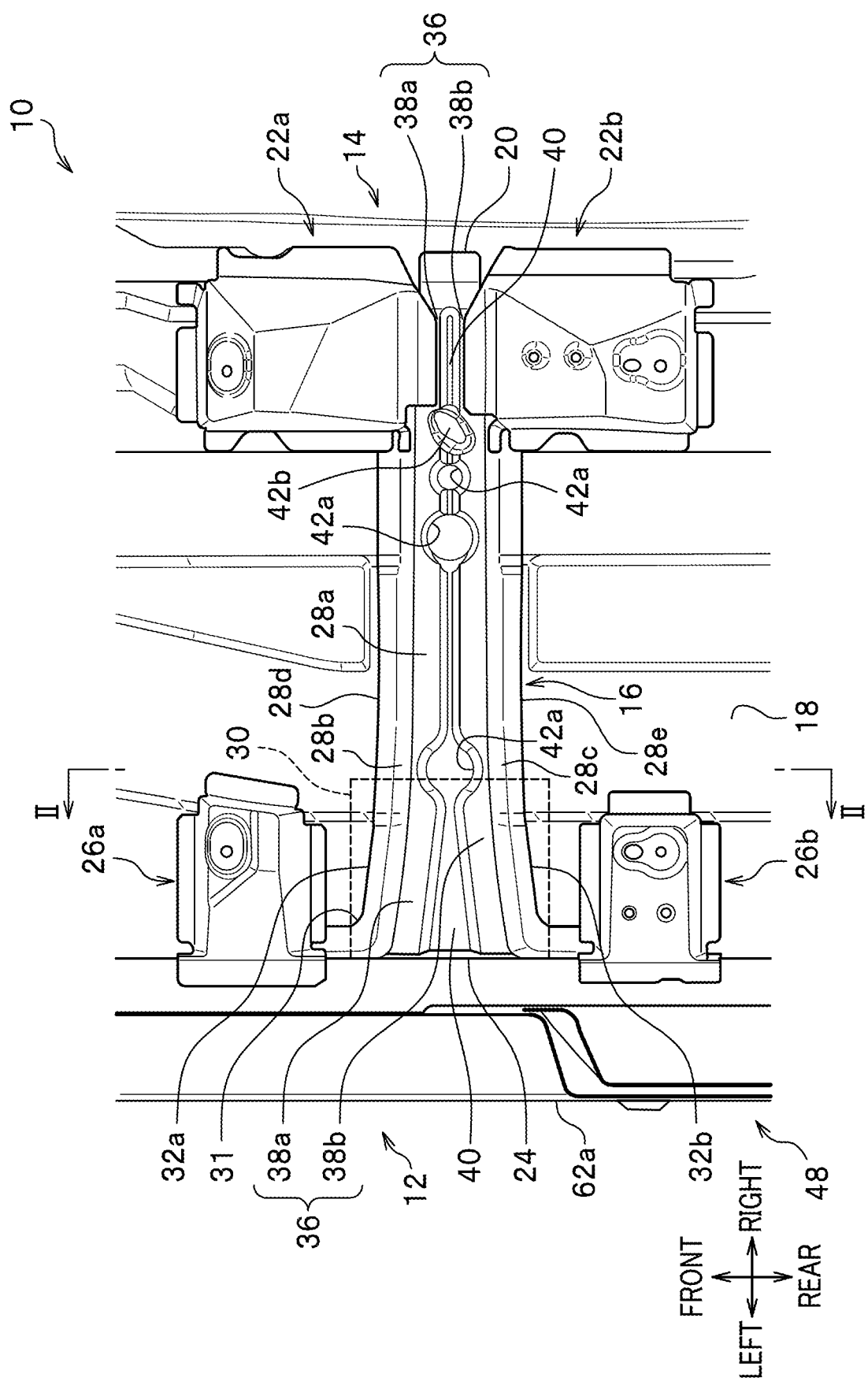
FIG. 1 is a plan view of a front portion of a vehicle applied with a lower vehicle-body structure according to an embodiment of the present invention, as viewed from above.

As shown in FIG. 1, a vehicle 10 applied with a lower vehicle-body structure according to the embodiment of the present invention includes a side sill 12 disposed on an outer side in the vehicle width direction thereof, a floor tunnel 14 disposed in the center of a vehicle body, a single floor cross member 16 disposed along the vehicle width direction and coupling the side sill 12 to the floor tunnel 14, a floor panel 18 disposed between the side sill 12 and the floor tunnel 14, and a tunnel reinforcing member 19 (see FIGS. 11 and 14) provided in the floor tunnel 14 and reinforcing the floor tunnel 14.

An inner end 20 in the vehicle width direction of the floor cross member 16, adjacent to the floor tunnel 14, is disposed so as to be held between a pair of first seat brackets 22a and 22b in the vehicle front-rear direction. An outer end 24 in the vehicle width direction of the floor cross member 16, adjacent to the side sill 12, is disposed so as to be held between a pair of second seat brackets 26a and 26b in the vehicle front-rear direction. The first seat brackets 22a and 22b, and the second seat brackets 26a and 26b are each a member having a box-shape and supporting a seat (not shown) from below.

Figure 2:
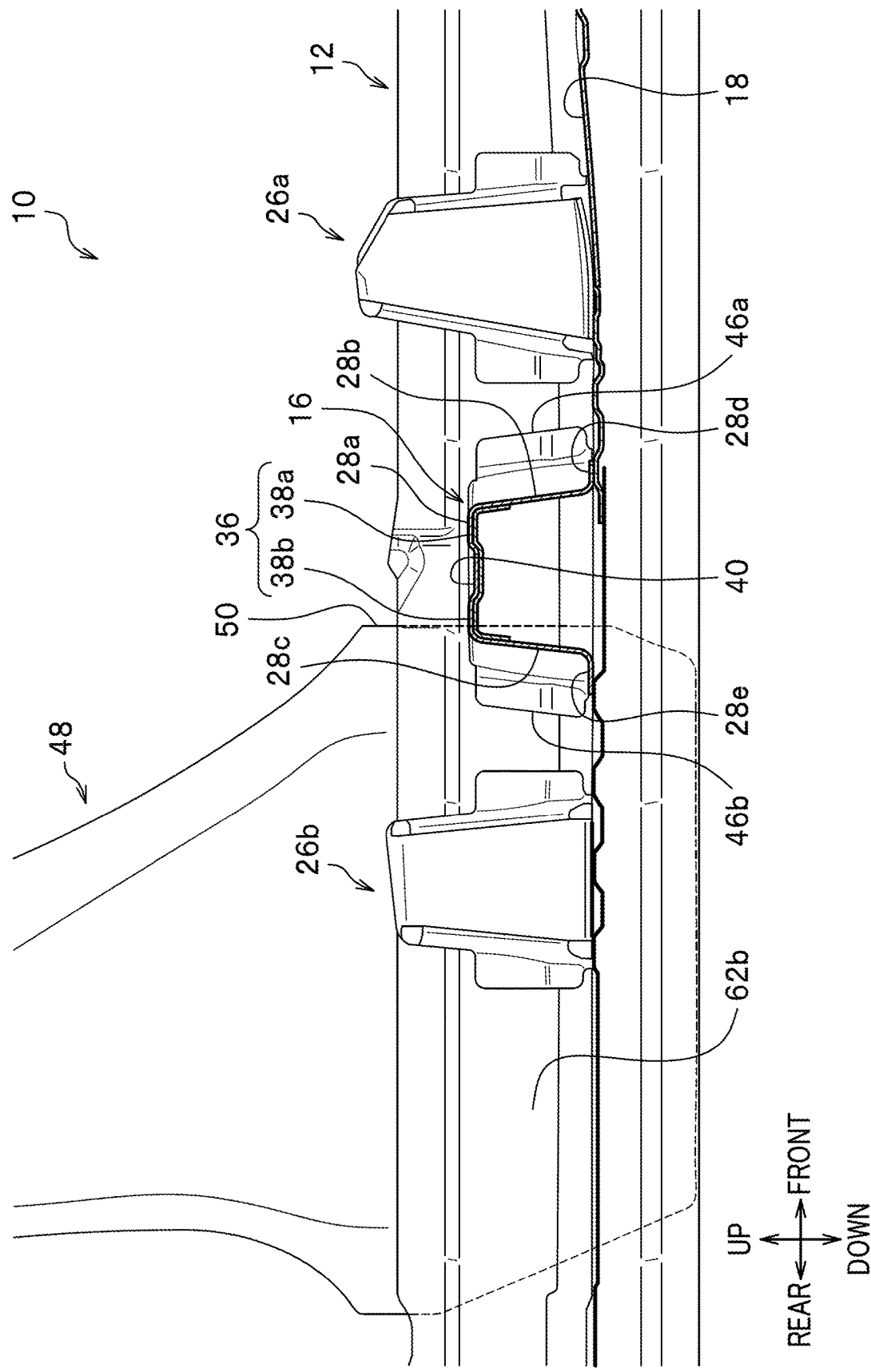
FIG. 2 is a vertical cross-sectional view, taken along a line II-II in FIG. 1.

The floor cross member 16 has a substantially hat-shape in axial cross section (see FIG. 2). As shown in FIG. 2, the floor cross member 16 has an upper wall 28a to form an upper surface thereof, a front wall 28b which is bent downward from a front end in the vehicle front-rear direction of the upper wall 28a and extends along the vehicle width direction, a rear wall 28c which is bent downward from a rear end in the vehicle front-rear direction of the upper wall 28a and extends along the vehicle width direction, a front flange 28d which is bent forward in the vehicle front-rear direction from a lower end of the front wall 28b, and a rear flange 28e which is bent rearward in the vehicle front-rear direction from a lower end of the rear wall 28c. The front flange 28d and the rear flange 28e are each joined and fixed to an upper surface of the floor panel 18 by spot welding, for example, or the like.

Further, the outer end 24 in the vehicle width direction of the floor cross member 16 is provided with a widened portion 30 having a wider width in the vehicle front and rear directions toward the side sill 12 (see a portion enclosed by dashed lines in FIG. 1). The widened portion 30 has a front widened portion 32a which is widened forward in the vehicle front-rear direction and a rear widened portion 32b which is widened rearward in the vehicle front-rear direction, at the outer end 24 in the vehicle-width direction of the floor cross member 16. A front end 31 in the vehicle front-rear direction of the widened portion 30 (front widened portion 32a), which is coupled to the side sill 12, is disposed forward with respect to a center pillar 48.

Figure 7:
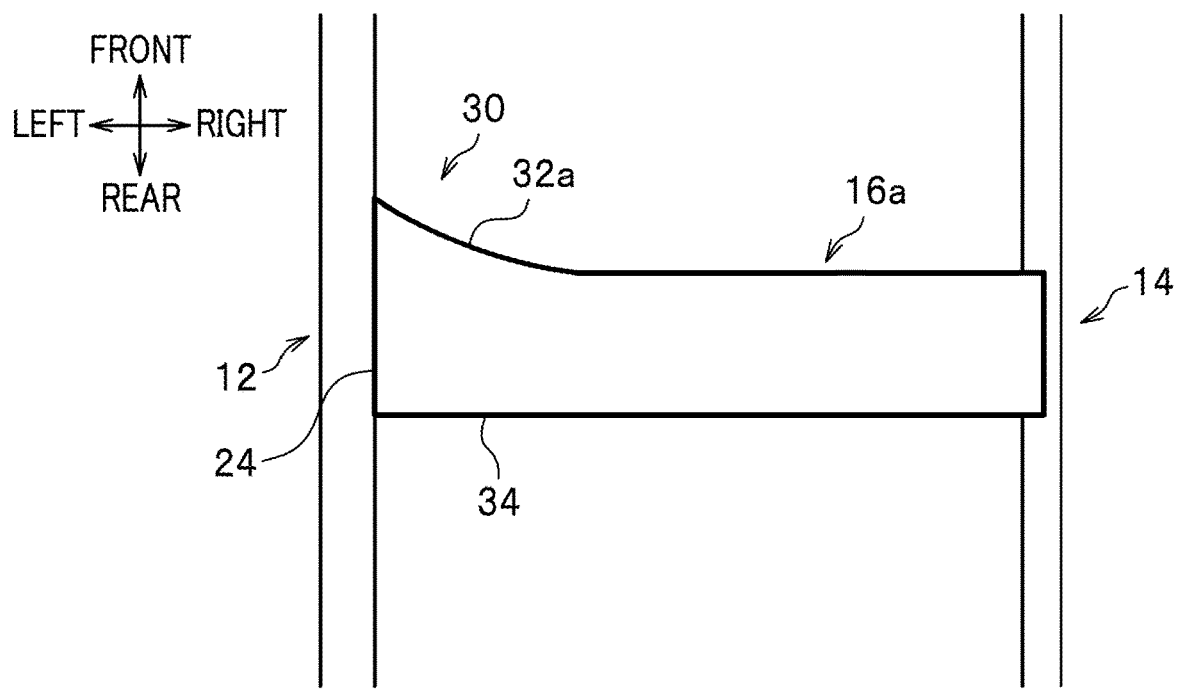
FIG. 7 is a schematic diagram of a modification of a widened portion of a floor cross member.
Figure 8:
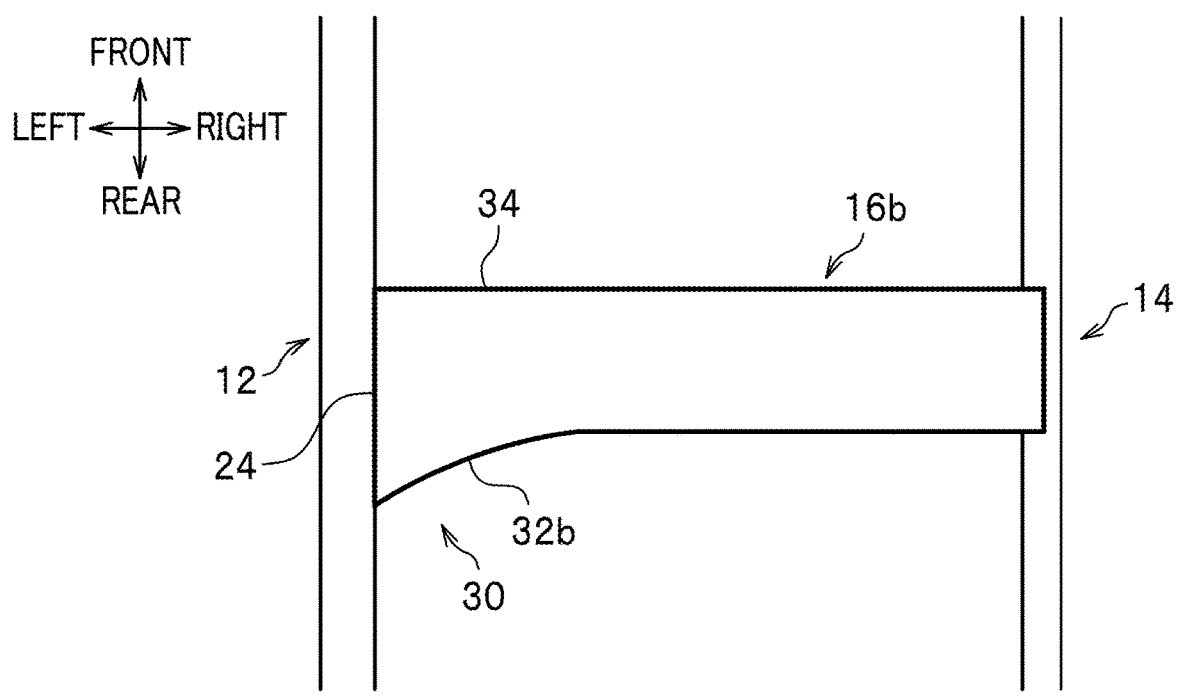
FIG. 8 is a schematic diagram of another modification of the widened portion of the floor cross member.

In the present embodiment, the widened portion 30 has both the front widened portion 32a and the rear widened portion 32b, but is not limited thereto. For example, as shown in a modification in FIG. 7, the widened portion 30 may only have the front widened portion 32a which is widened forward in the vehicle front-rear direction at the outer end 24 in the vehicle-width direction of a floor cross member 16a, and a rear end thereof has a flat portion 34 which is not widened and is continuous to the rest of the floor cross member 16a. Further, as shown in a floor cross member 16b of another modification in FIG. 8, the widened portion 30 may only have the rear widened portion 32b which is widened rearward in the vehicle front-rear direction, and a front end thereof has the flat portion 34 which is not widened and is continuous to the rest of the floor cross member 16b. Thus, the widened portion 30 includes one having at least one of the front and rear widened portions.

As shown in FIGS. 1 and 2, the upper wall 28a of the floor cross member 16 is provided, on an upper surface thereof, with a bead 36 which bulges upward and extends along the vehicle width direction. The bead 36 has a front bead 38a extending along the front wall 28b and a rear bead 38b extending along the rear wall 28c. The front bead 38a and the rear bead 38b extend beyond the widened portion 30, which is positioned on the outer side in vehicle width direction, up to positions (in the vicinity of the floor tunnel 14) of the first seat brackets 22a and 22b, which are disposed inside in the vehicle width direction with respect to the widened portion 30.

A recess 40 recessed toward the floor panel 18 (downward) is formed between the front bead 38a and the rear bead 38b. The recess 40 extends along a longitudinal direction (vehicle width direction) of the floor cross member 16 and is configured to increase in width in the vehicle front-rear direction at the widened portion 30. Therefore, the width in the vehicle front-rear direction of the recess 40 closest to the side sill 12 is the largest. The recess 40 is formed, at middle portions thereof, with a plurality of circular recesses 42a having a large, middle, and small inner diameters, respectively and a single oval recess 42b, for example. Note that the width of the recess 40, excluding the recess 40 formed at the widened portion 30, the circular recesses 42a, and the oval recess 42b, is formed substantially constant. Note that, in the present embodiment, the recess 40 is formed between the front bead 38a and the rear bead 38b as an example, but is not limited thereto, and a convex portion which bulges upward may be formed in place of the recess 40.

Figure 9:
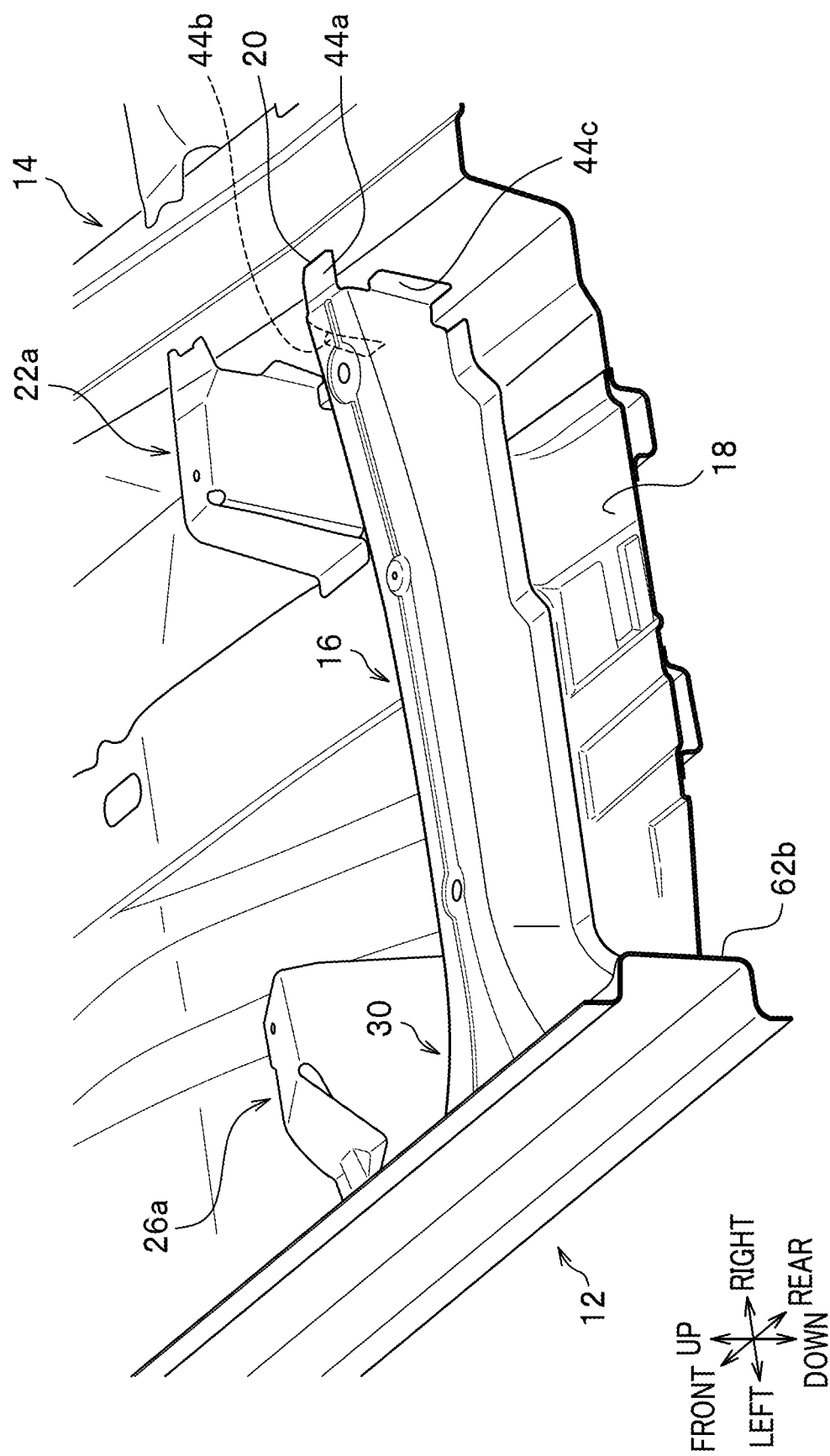
FIG. 9 is a partially broken perspective view of an inner end in a vehicle width direction of the floor cross member being coupled to a floor tunnel.

The inner end 20 in the vehicle width direction of the floor cross member 16 is coupled to the floor tunnel 14. That is, as shown in FIG. 9, the inner end 20 in the vehicle width direction of the floor cross member 16 has an upper flange 44a, which is joined to an upper surface of the floor tunnel 14, and a front flange 44b and a rear flange 44c, which are joined to a side surface of the floor tunnel 14.

In addition, the first seat brackets 22a and 22b, coupled to the floor tunnel 14 are provided at an end of the floor cross member 16 (a portion adjacent to the inner end 20 in the vehicle width direction), closer to the floor tunnel 14. The recess 40 formed in the upper surface of the floor cross member 16 extends up to a position to overlap in the vehicle width direction with the first seat brackets 22a and 22b (see FIG. 1).

Further, the outer end 24 in the vehicle width direction of the floor cross member 16 has a front flange 46a and a rear flange 46b which are joined to the side sill 12 (inner side sill 62b) (see FIG. 2). In the vehicle front-rear direction, the rear flange 46b is joined (coupled) to the side sill 12 at a position to overlap a front end 50 in the vehicle front-rear direction of the center pillar 48, and the front flange 46a is joined (coupled) to the side sill 12 at a forward position in the vehicle front-rear direction with respect to the center pillar 48.

Figure 4:
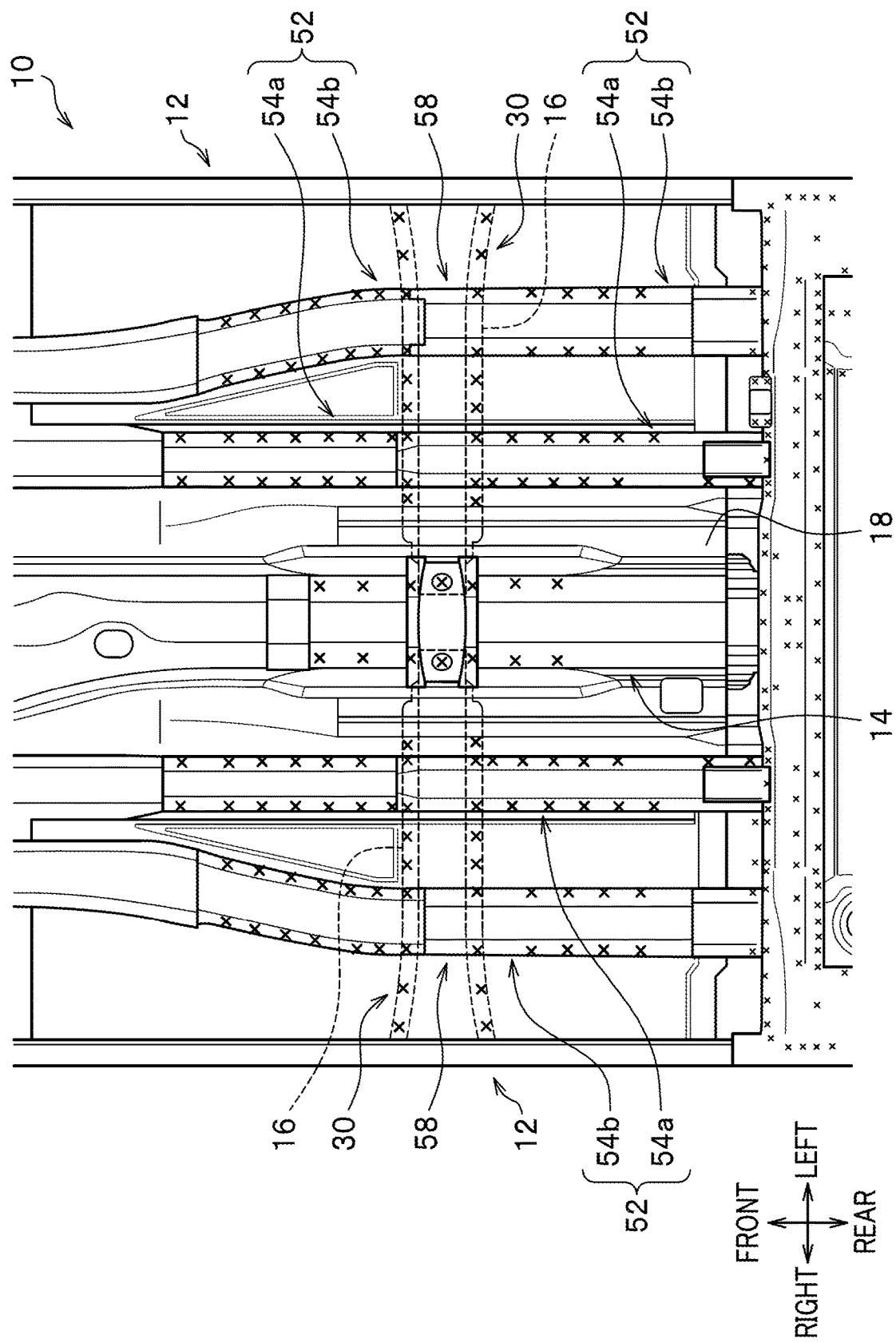
FIG. 4 is a partially transparent bottom view of the front portion of the vehicle shown in FIG. 1, as viewed from bottom.

The floor panel 18 is provided, at a lower surface thereof to face the ground, with a floor frame 52 extending along the vehicle front-rear direction. As shown in FIG. 4, the floor frame 52 has an inner floor frame 54a closer to the floor tunnel 14 and an outer floor frame 54b closer to the side sill 12. The inner floor frame 54a is disposed linearly along the floor tunnel 14. The outer floor frame 54b has a rear portion with respect to the floor cross member 16, which is disposed linearly along the side sill 12, and a front portion with respect to the floor cross member 16, which is bent inward in the vehicle width direction.

Figure 3:
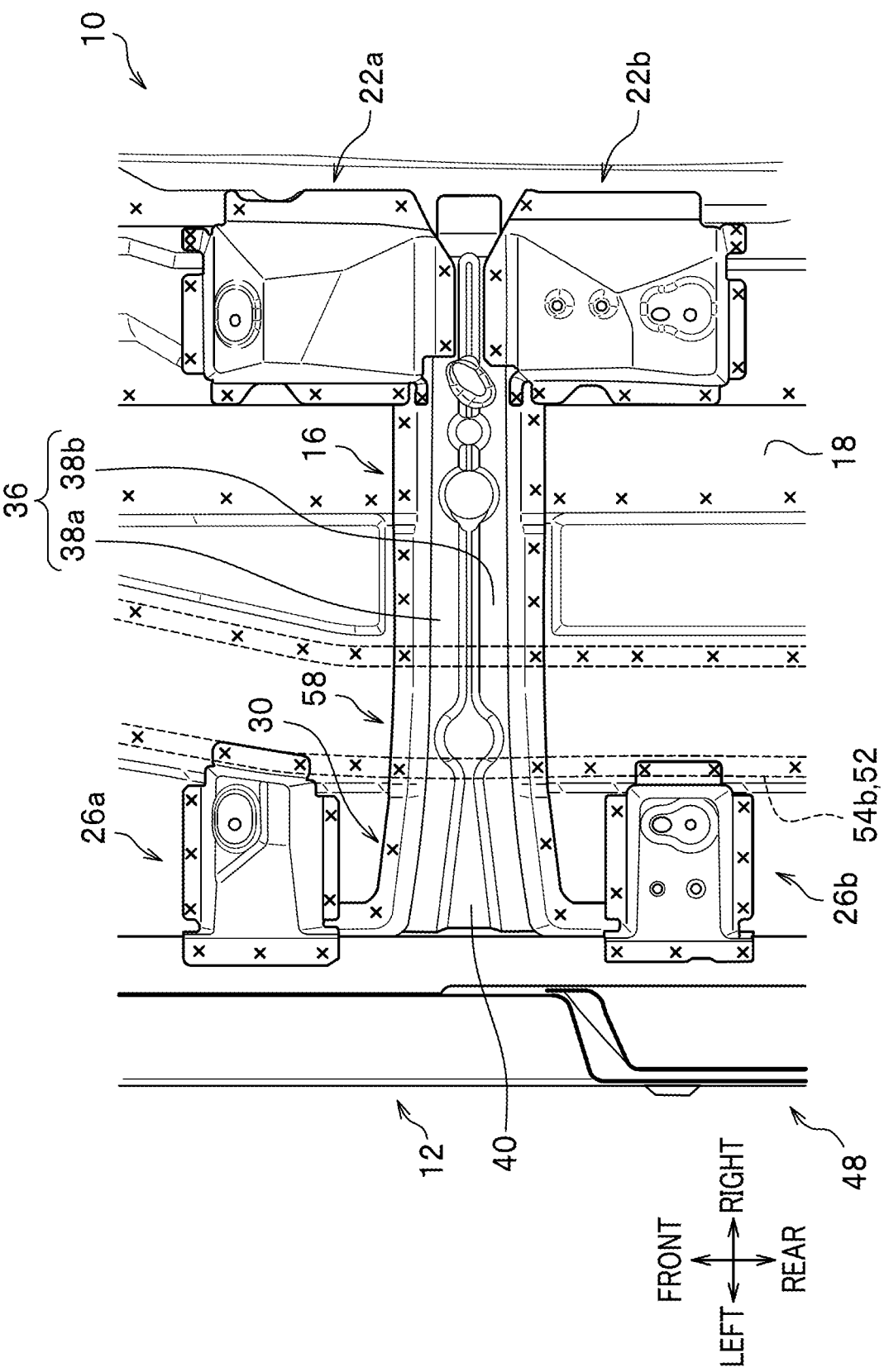
FIG. 3 is a partially transparent plan view of the front portion of the vehicle shown in FIG. 1.

As shown in FIGS. 3 and 4, the floor cross member 16 is disposed to intersect the floor frame 52 (inner floor frame 54a and outer floor frame 54b). In addition, the widened portion 30 of the floor cross member 16 is widened from a position to overlap in the vehicle up-down direction with (intersect) the outer floor frame 54b toward an outer side in the vehicle width direction (toward the side sill 12), in planar view (see FIG. 3).

Further, at least a portion (such as the rear wall 28c or the like) of the floor cross member 16 is disposed at a position to overlap in the vehicle front-rear direction (as viewed in the vehicle width direction) with the front end 50 in the vehicle front-rear direction provided at a lower end of the center pillar 48 (see FIG. 2).

Figure 6:
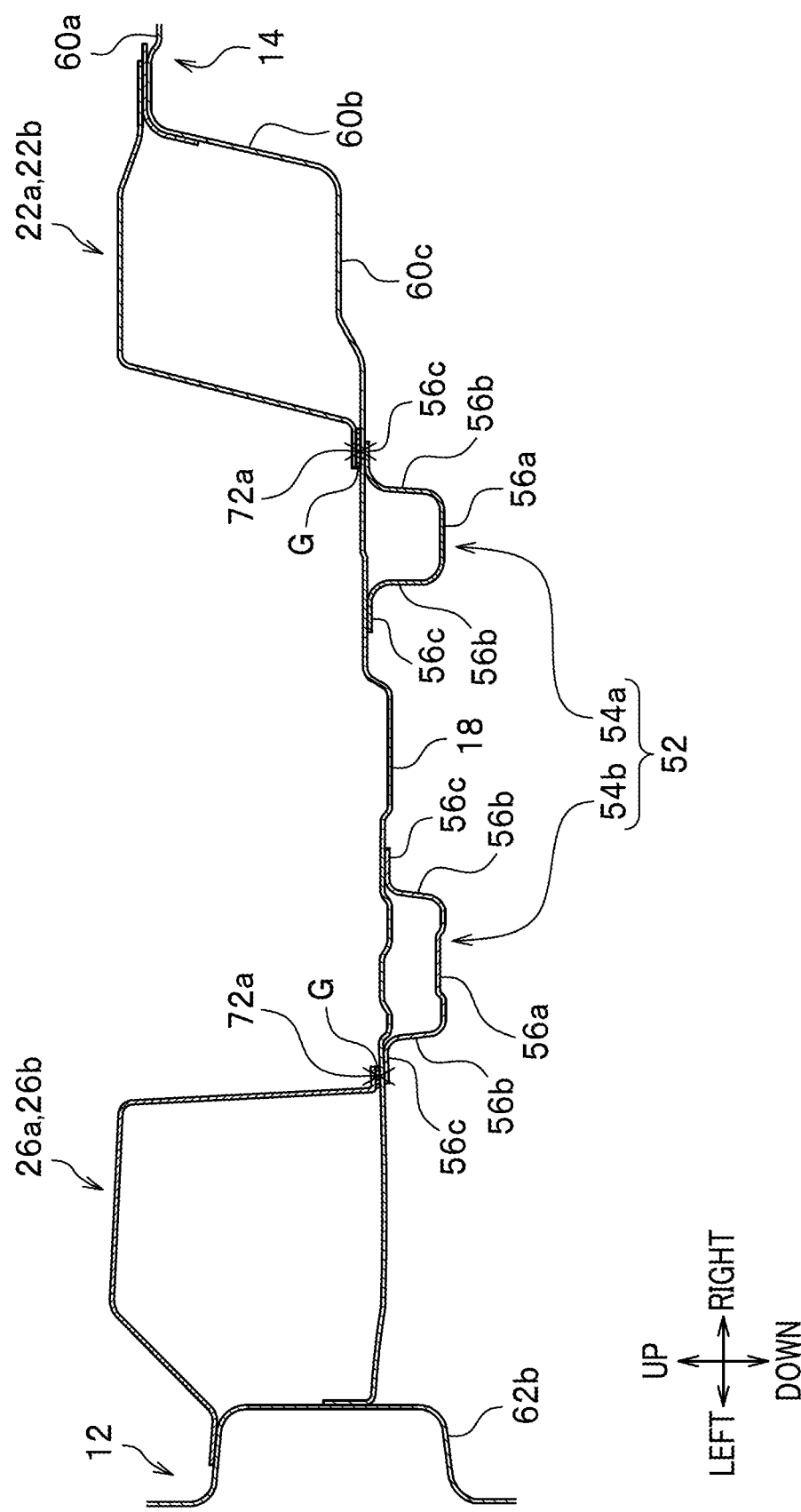
FIG. 6 is an end view of an inner floor frame and an outer floor frame.

As shown in FIG. 6, the floor frame 52 has a hat-shape in axial cross section, and has a lower wall 56*a*, a pair of side walls 56*b* continuing to the lower wall 56*a* and facing each other, and flanges 56*c* continuing to upper ends of the side walls 56*b*. The flanges (front flange 28*d* and rear flange 28*e*) of the floor cross member 16 and the flanges 56*c* of the floor frame 52 are welded and fixed to the upper surface and lower surface of the floor panel 18, respectively.

In other words, the floor panel 18 has the flanges (front flange 28*d* and rear flange 28*e*) of the floor cross member 16 joined to the upper surface thereof (see FIG. 2), and the flanges 56*c* of the floor frame 52 joined to the lower surface thereof (see FIG. 6). In this case, three members are overlapped in the up-down direction with each other and welded simultaneously and integrally at the intersection 58 at which the flanges (front flange 28*d* and rear flange 28*e*) of the floor cross member 16 vertically intersects the flanges 56*c* of the floor frame 52 (see joint points at the intersection 58 in FIG. 3).

Further, as shown in FIG. 6, the floor panel 18 has flanges 72*a* of the first seat brackets 22*a* and 22*b* (second seat brackets 26*a* and 26*b*) joined to the upper surface thereof, and flanges 56*c* of the floor frame 52 (54*a* and 54*b*) joined to the lower surface thereof. In this case, the three members of the seat bracket (22*a*, 22*b*, 26*a*, and 26*b*), the floor panel 18, and the floor frame 52 are overlapped in the up-down direction with each other and spot welded simultaneously and integrally. Note that glue G is placed in a welded region between the flange 72*a* and the upper surface of the floor panel 18 (see FIG. 6).

Figure 12:
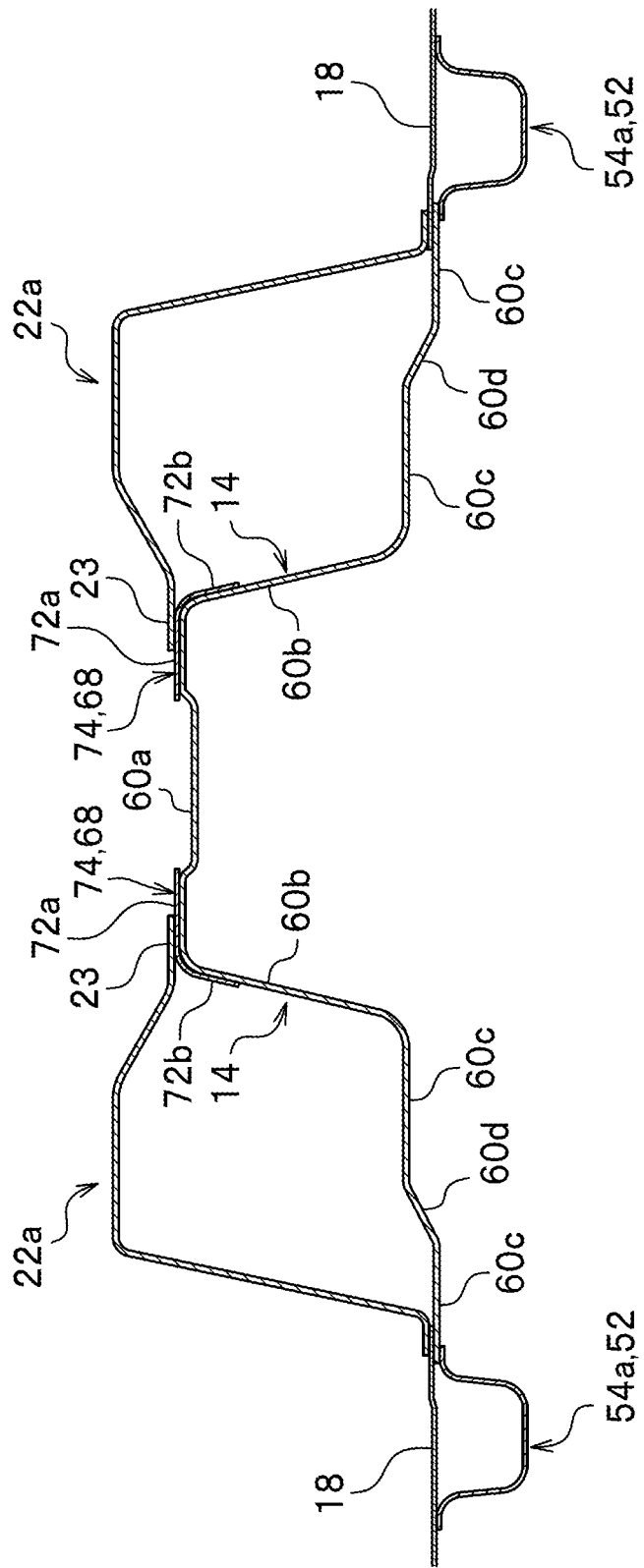
FIG. 12 is an end view, taken along a line XII-XII in FIG. 11.

As shown in FIG. 12, the floor tunnel 14 has a hat-shape in axial cross section. The floor tunnel 14 has a pair of tunnel side walls 60*b* facing the side sill 12, a tunnel upper wall 60*a* connecting upper ends of the pair of tunnel side walls 60*b*, and a pair of tunnel lower walls 60*c* bent from lower ends of the tunnel side walls 60*b* and extending along the vehicle width direction. The tunnel lower wall 60*c* is provided in the middle thereof with an inclined wall 60*d* inclining downward from an inner side in the vehicle width direction thereof toward an outer side in the vehicle width direction thereof.

The tunnel reinforcing member 19 has a first tunnel reinforcing member 66 (see FIG. 14) provided outside a vehicle compartment so as to face the ground and second tunnel reinforcing members 68 (see FIG. 11) provided inside the vehicle compartment. In the present embodiment, the first tunnel reinforcing member 66 is provided outside the vehicle compartment and the second tunnel reinforcing members 68 are provided inside the vehicle compartment, but the present invention is not limited thereto and said members may be provided either inside or outside the vehicle compartment.

Figure 14:
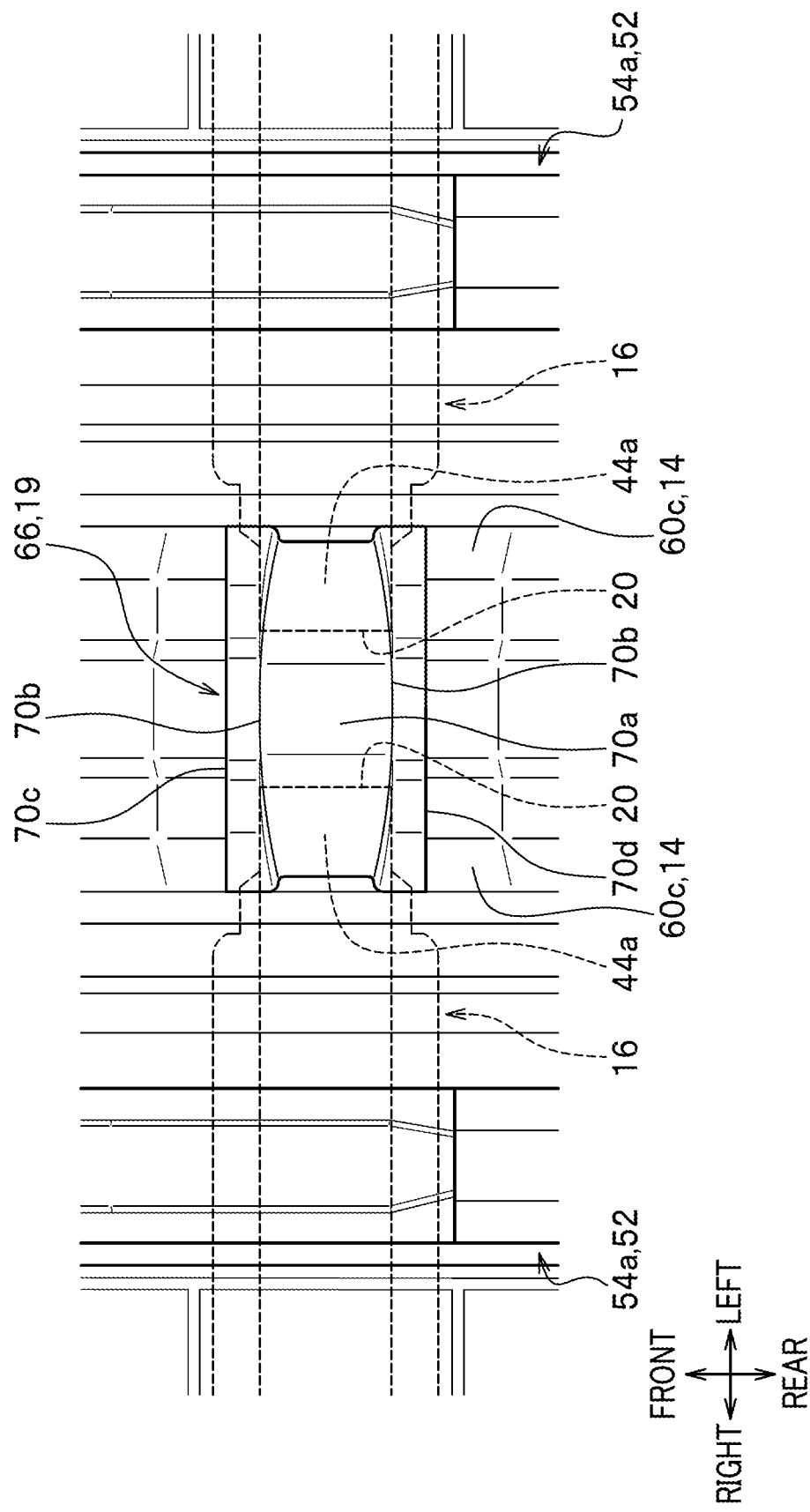
FIG. 14 is an enlarged bottom view of the first tunnel reinforcing member shown in FIG. 10.

As shown in FIG. 14, the first tunnel reinforcing member 66 has a rectangular shape in bottom view and has a hat-shape in cross section along the vehicle front-rear direction. The first tunnel reinforcing member 66 is disposed between one floor cross member 16 (on the left side in a planar view, for example) and the other floor cross member 16 (on the right side in a planar view, for example), which face each other along the vehicle width direction, to couple the one floor cross member 16 with the other floor cross member 16 in the middle in the vehicle width direction (see FIG. 10), as described below. In other words, the first tunnel reinforcing member 66 is disposed at a position to overlap in the vehicle front-rear direction with the right and left floor cross members 16. In still other words, the first tunnel reinforcing member 66 is aligned in the vehicle width direction with the right and left floor cross members 16.

As shown in FIG. 14, the first tunnel reinforcing member 66 has a bottom wall 70*a* facing the ground, a pair of side walls 70*b* bent upward from a front end and a rear end in the vehicle front-rear direction of the bottom wall 70*a* and facing each other, and a front joining flange 70*c* and a rear joining flange 70*d*, which respectively extend forward and rearward in the vehicle front-rear direction from a front end and a rear end of the pair of side walls 70*b*.

The front joining flange 70*c* and the rear joining flange 70*d* of the first tunnel reinforcing member 66 are respectively joined to a lower surface of the tunnel lower wall 60*c* of the floor tunnel 14 by spot welding, for example, or the like. Further, the inner end 20 in the vehicle width direction of the floor cross member 16 is coupled to the floor tunnel 14. That is, the upper flange 44*a* of the floor cross member 16 is joined to the tunnel upper wall 60*a* of the floor tunnel 14, and the front flange 44*b* and the rear flange 44*c* of the floor cross member 16 are joined to the tunnel side walls 60*b* of the floor tunnel 14, respectively. As a result, the first tunnel reinforcing member 66 is coupled to the floor cross member 16 via the floor tunnel 14.

Figure 11:
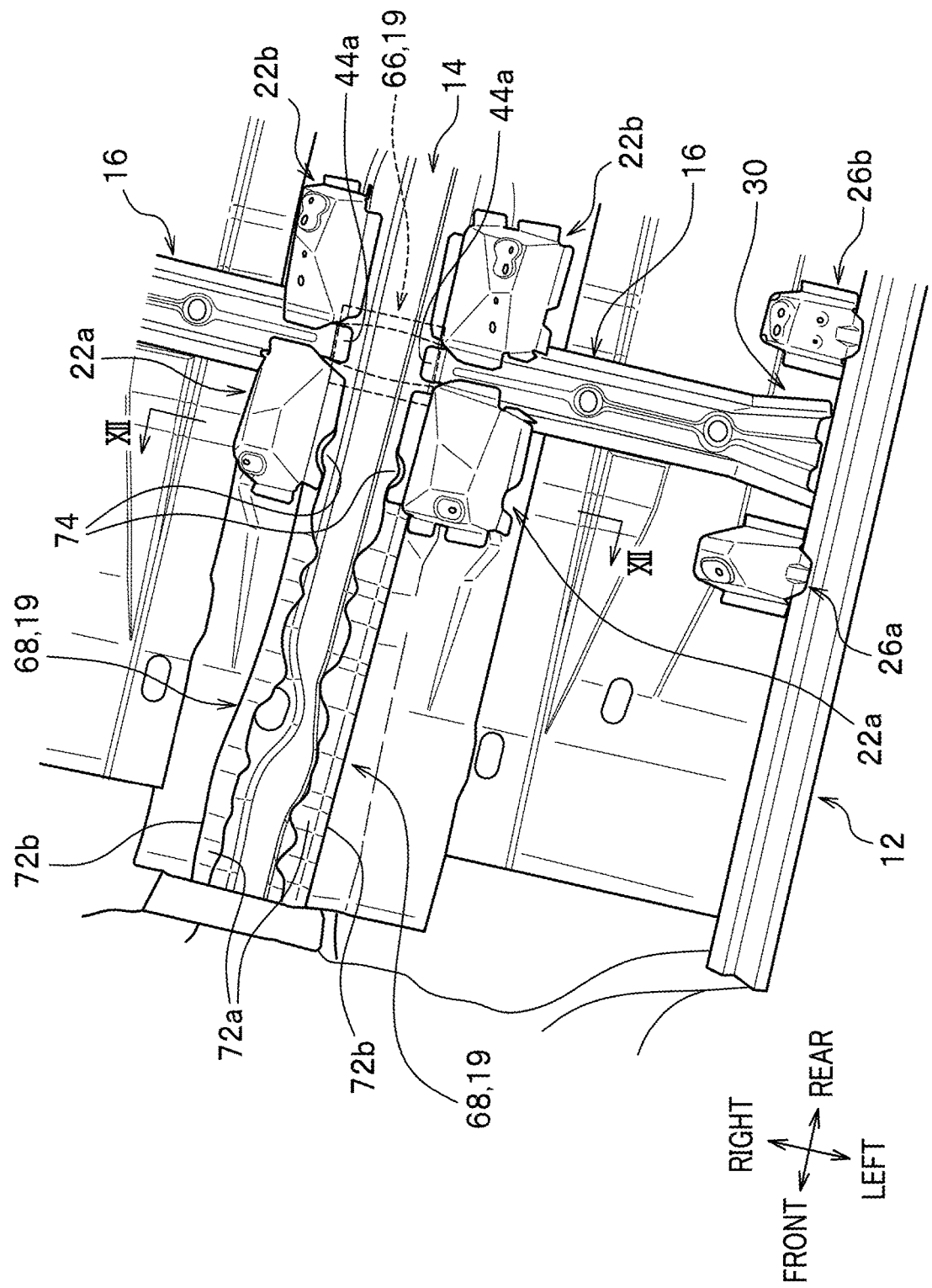
FIG. 11 is a partially enlarged perspective view of a second tunnel reinforcing member.

As shown in FIGS. 11 and 12, each of the second tunnel reinforcing members 68 integrally includes an upper wall 72*a* having a substantially hat-shape in axial cross section and joined to the tunnel upper wall 60*a* of the floor tunnel 14, and a side wall 72*b* bent downward from an outer end of the upper wall 72*a* and joined to the tunnel side wall 60*b* of the floor tunnel 14. The second tunnel reinforcing members 68 extend in the vehicle front-rear direction along a ridge of the floor tunnel 14 and are disposed to face each other along the vehicle width direction.

In addition, a rear portion 74 in the vehicle front-rear direction, which is at least a portion of each of the second tunnel reinforcing members 68, is disposed at a position to overlap in the vehicle width direction with the first seat bracket 22*a* on the front side (see FIG. 12). That is, the rear portion 74 in the vehicle front-rear direction of the second tunnel reinforcing member 68 is interposed between an inner end 23 in the vehicle width direction of the first seat bracket 22*a* and the tunnel upper wall 60*a* of the floor tunnel 14, and three members of the rear portion 74 in the vehicle front-rear direction of the second tunnel reinforcing member 68, the inner end 23 in the vehicle width direction of the first seat bracket 22*a*, and the tunnel upper wall 60*a* of the floor tunnel 14, are joined integrally. Accordingly, the first seat bracket 22*a* on the front side is joined (coupled) to the second tunnel reinforcing members 68 which extend in the vehicle front-rear direction across the tunnel side walls 60*b* and the tunnel upper wall 60*a*.

Figure 13:
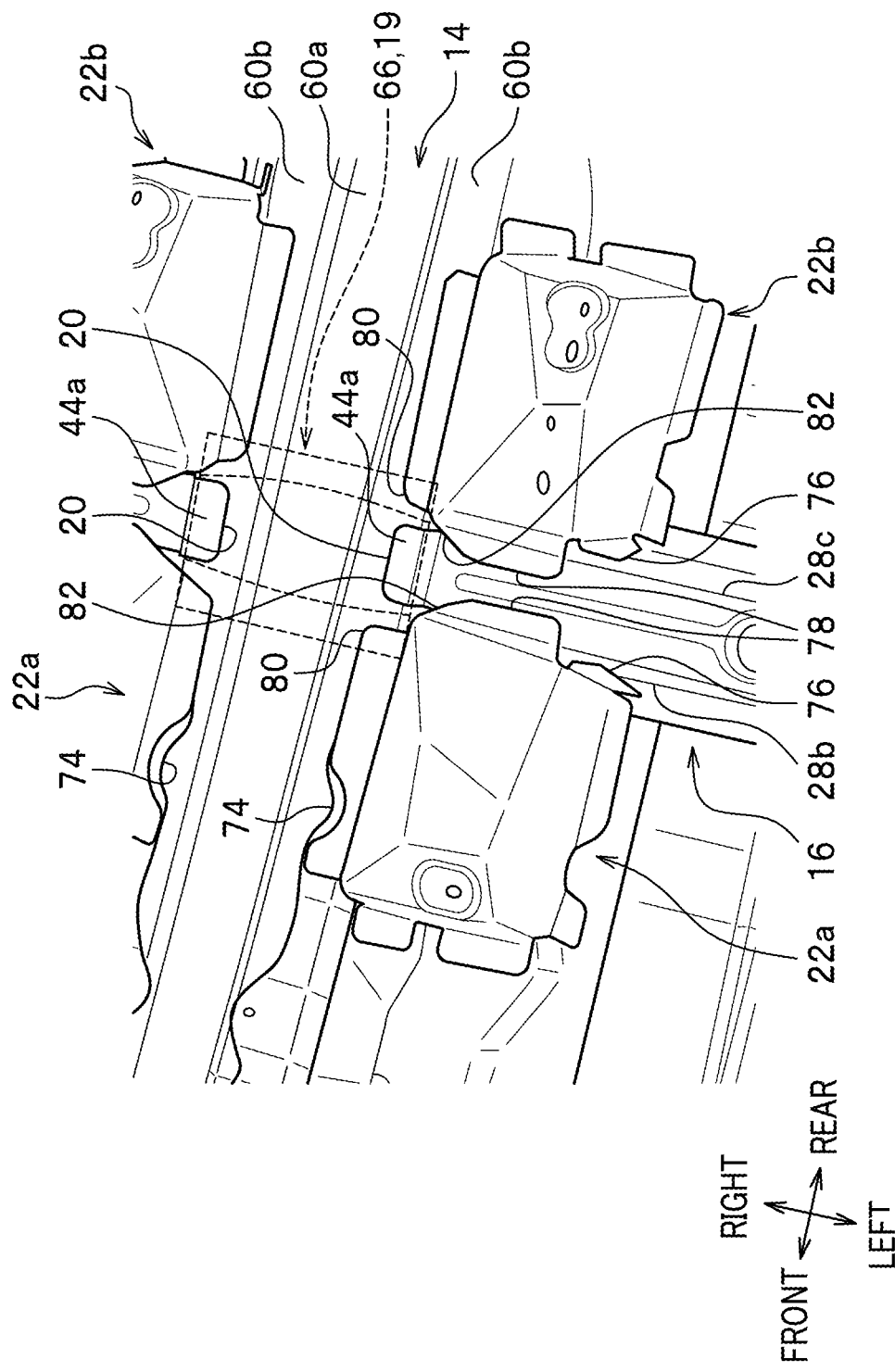
FIG. 13 is a partially enlarged view of a first to third flanges provided in a seat bracket.

As shown in FIG. 13, the first seat brackets 22*a* and 22*b* disposed closer to the floor tunnel 14 each have a first flange 76, a second flange 78, and a third flange 80. The first flange 76 is positioned on an outer side in the vehicle width direction and joined to both the front wall 28*b* and the rear wall 28*c* of the floor cross member 16. The second flange 78 is positioned between the first flange 76 and the third flange 80 and joined to the upper wall 28*b* of the floor cross member 16. The third flange 80 is positioned on an inner side in the vehicle width direction with respect to the second flange 78 and joined to the first tunnel reinforcing member 66 via the floor tunnel 14. The first seat brackets 22*a* and 22*b* are coupled (joined) to the floor cross member 16 via the first flanges 76, the second flanges 78, and portions (rear end of the former and front end of the latter, respectively) of the third flanges 80.

Figure 10:
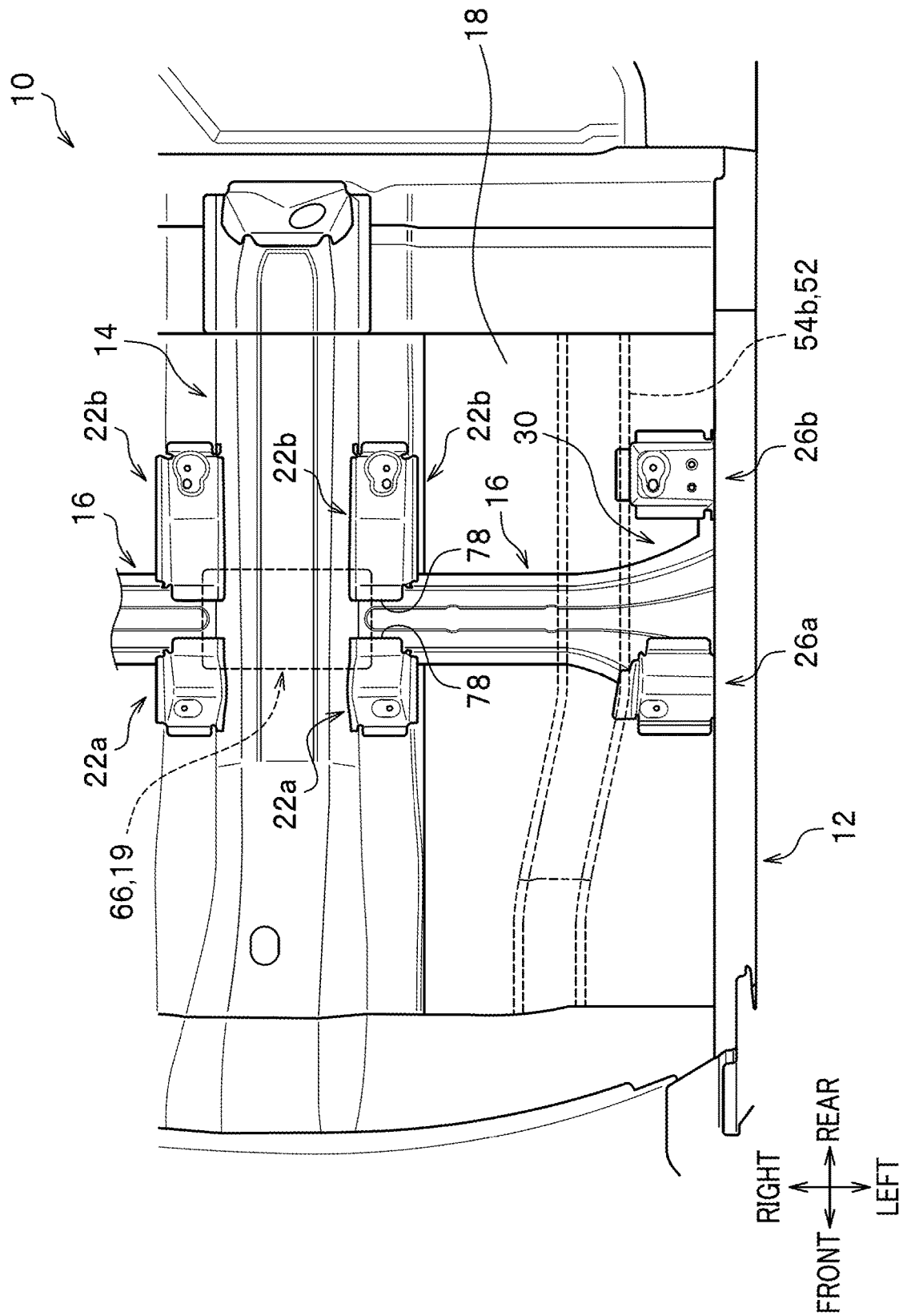
FIG. 10 is a partially transparent plan view of one floor cross member being coupled to the other floor cross member via a first tunnel reinforcing member.

The second flange 78 positioned on a front side of the first seat bracket 22*b* and the second flange 78 positioned on a rear side of the seat bracket 22*a* are disposed apart from each other in the vehicle front-rear direction (see FIG. 10). In addition, the front and rear second flanges 78 are each provided, at an inner portion in the vehicle width direction thereof, with an inclined portion 82 inclining more in the vehicle front-rear direction toward the floor tunnel 14.

The second seat brackets 26*a* and 26*b*, disposed closer to the side sill 12, are joined to the upper surface of the floor panel 18 by spot welding, for example, or the like. The floor panel 18 has the floor frame 52 joined thereto, on the lower surface thereof, so as to intersect the floor cross member 16. Accordingly, the second seat brackets 26*a* and 26*b* are joined to the floor frame 52 via the floor panel 18.

The side sill 12 has an outer side sill 62*a* (see FIG. 1) disposed on the outer side in the vehicle width direction and an inner side sill 62*b* (see FIG. 9) disposed on the inner side in the vehicle width direction. In a cross section in the axial direction of the side sill 12, a reinforcing member which cross-sectionally reinforces the side sill 12 is provided between the outer side sill 62*a* and the inner side sill 62*b*.

The vehicle 10 applied with the lower vehicle-body structure of the present embodiment is basically formed as described above, and advantageous effects thereof are described below.

The present embodiment includes: the floor cross member 16 coupling the side sill 12 disposed on the outer side in the vehicle width direction of the vehicle body to the floor tunnel 14 disposed in the center in the vehicle width direction of the vehicle body, and disposed so as to be held between the first seat brackets 22*a* and 22*b* in the vehicle front-rear direction; and the tunnel reinforcing member 19 provided in the floor tunnel 14. The tunnel reinforcing member 19 includes the first tunnel reinforcing member 66 disposed at a position to overlap in the vehicle front-rear direction with the floor cross member 16, and the second tunnel reinforcing members 68 disposed at positions to overlap in the vehicle width direction with the first seat brackets 22*a* and 22*b*. The first seat brackets 22*a* and 22*b* are joined (coupled) to the floor cross member 16.

The present embodiment includes the first seat brackets 22*a* and 22*b* to be joined to the floor cross member 16 so as to be aligned in the vehicle front-rear direction and the first tunnel reinforcing member 66 to overlap in the vehicle front-rear direction with the floor cross member 16, so that a side impact load applied at the time of side collision can be smoothly transmitted from the floor cross member 16 to the first tunnel reinforcing member 66. In addition, the side impact load can be transmitted and dispersed to the second tunnel reinforcing members 68 via the first seat brackets 22*a* and 22*b*. Accordingly, in the present embodiment, the floor tunnel 14 and the first seat brackets 22*a* and 22*b*, even when the side impact load is transmitted thereto via the floor cross member 16, are prevented from being deformed. As a result, the present embodiment can prevent a floor panel region including the floor tunnel 14 from being deformed. In addition, the present embodiment can improve rigidity of a lower portion of the vehicle body.

Further, in the present embodiment, the first tunnel reinforcing member 66 is coupled to the floor cross member 16 via the floor tunnel 14.

In the present embodiment, the first tunnel reinforcing member 66 being joined to the floor cross member 16 allows for transmitting the side impact load applied to one floor cross member 16 to the other floor cross member 16 via the first tunnel reinforcing member 66. Accordingly, floor tunnel 14 is prevented from being deformed due to the side impact load. In addition, in the present embodiment, the side impact load can be dispersed by the first seat brackets 22*a* and 22*b*, and the floor cross member 16, so that the first seat brackets 22*a* and 22*b*, and the floor cross member 16 are prevented from being deformed.

Further, in the present embodiment, the floor tunnel 14 has the pair of tunnel side walls 60*b* facing the side sill 12 and the tunnel upper wall 60*a* connecting the upper ends of the tunnel side walls 60*b* with each other. The first seat bracket 22*a* on the front side is joined (coupled) to the second tunnel reinforcing members 68 which extend in the vehicle front-rear direction across the tunnel side walls 60*b* and the tunnel upper wall 60*a*.

In the present embodiment, the first seat bracket 22*a* on the front side is joined to the second tunnel reinforcing members 68, so that the side impact load transmitted from the floor cross member 16 to the first seat bracket 22*a* on the front side can be dispersed over the entire floor tunnel 14. Accordingly, the floor panel region (floor panel 18 and floor tunnel 14) is prevented from being deformed due to the side impact load.

Moreover, in the present embodiment, the floor cross member 16 has the upper wall 28*a* to form the upper surface thereof, the front wall 28 on the front side in the vehicle front-rear direction, and the rear wall 28*c* on the rear side in the vehicle front-rear direction. The first seat brackets 22*a* and 22*b* have the first flanges 76 joined to the front wall 28*b* and the rear wall 28*c* of the floor cross member 16, respectively, the second flanges 78 joined to the upper wall 28*a*, and the third flanges 80 positioned on the inner side in the vehicle width direction with respect to the second flanges 78. The third flanges 80 have the front end and rear end thereof, as at least portions thereof, coupled to the first tunnel reinforcing member 66 via the floor tunnel 14.

In the present embodiment, the first seat brackets 22*a* and 22*b* are joined to the floor cross member 16 via the first flanges 76 and the second flanges 78, and the third flanges 80 are coupled to the first tunnel reinforcing member 66, so that a side impact load can be transmitted to the first tunnel reinforcing member 66 while the side impact load applied to the floor cross member 16 is dispersed to the first seat brackets 22*a* and 22*b*, and the second tunnel reinforcing members 68. As a result, the present embodiment can further prevent the floor panel region including the floor tunnel 14 from being deformed.

Further, in the present embodiment, the second flanges 78 positioned on the front side and the rear side in the vehicle front-rear direction of the first seat brackets 22*a* and 22*b* are disposed apart from each other in the vehicle front-rear direction and have the inclined portions 82 which are more inclined in the vehicle front-rear direction toward the floor tunnel 14.

In the present embodiment, the second flanges 78 are disposed apart from each other and have the inclined portions 82 which incline in the vehicle front-rear direction, so that a side impact load applied from the floor cross member 16 can be transmitted along the vehicle front-rear direction (longitudinal direction of the floor tunnel 14). Thus, in the present embodiment, the side impact load applied to the first tunnel reinforcing member 66 is dispersed in the vehicle front-rear direction, to prevent the floor panel region including the floor tunnel 14 from being deformed.

Further, in the present embodiment, the seat bracket include the first seat brackets 22a and 22b disposed closer to the floor tunnel 14, and the second seat brackets 26a and 26b disposed closer to the side sill 12. The floor frame 52 disposed at a position intersecting the floor crossmember 16 is provided on the lower surface of the floor panel 18. The second seat brackets 26a and 26b are coupled to the floor frame 52 via the floor panel 18.

In the present embodiment, the second seat brackets 26a and 26b closer to the side sill 12 are joined to the floor frame 52 intersecting the floor cross member 16, so that an offset side impact load applied to one floor cross member 16 can efficiently be transmitted to the other floor cross member 16 via the floor frame 52. As a result, in the present embodiment, the offset side impact load is dispersed inside in the vehicle width direction of the floor crossmember 16, to prevent the floor panel region including the floor tunnel 14 from being deformed.

Further, in the present embodiment, the floor cross member 16 is disposed at a position to at least partly overlap in the vehicle front-rear direction with the front end 50 in the vehicle front-rear direction provided at the lower end of the center pillar 48.

In the present embodiment, the floor cross member 16 is disposed at a position to overlap in the vehicle front-rear direction with the front end 50 in the vehicle front-rear direction of the center pillar 48, so that a side impact load applied from the center pillar 48 and an offset side impact load applied from a forward position with respect to the center pillar 48 can be efficiently transmitted to the floor cross member 16, respectively. As a result, in the present embodiment, the side impact load (including the offset side impact load) transmitted to the floor cross member 16 can be dispersed to the floor tunnel 14, and the first seat brackets 22a and 22b, disposed inside in the vehicle width direction of the floor cross member 16.

Further, in the present embodiment, the outer end 24 in the vehicle width direction of the floor cross member 16 is provided with the widened portion 30 having a wider width in the vehicle front and rear directions toward the side sill 12. The front end 31 in the vehicle front-rear direction of the widened portion 30, which is coupled to the side sill 12, is disposed forward with respect to the center pillar 48.

Figure 5:
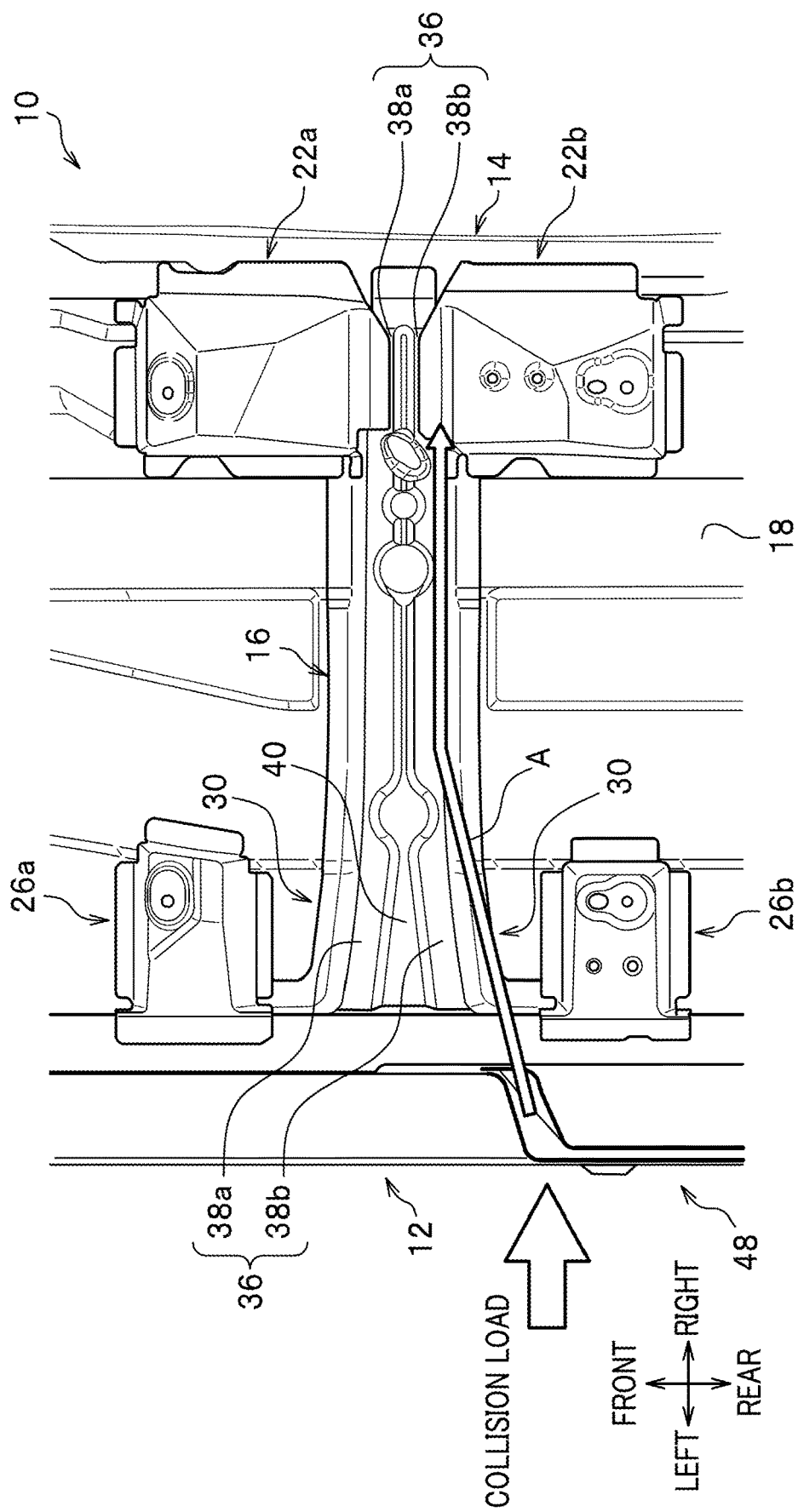
FIG. 5 illustrates a side collision load offset in a vehicle front-rear direction being transmitted.

In the present embodiment, the widened portion 30, which is formed by the outer end 24 in the vehicle width direction of the floor cross member 16 widened in the vehicle front and rear directions, is provided, so that, even when a side impact load is applied to a position offset in the vehicle front-rear direction with respect to the floor cross member 16, an offset side impact load can be efficiently transmitted along the widened portion 30 of the floor cross member 16 (see an open arrow A in FIG. 5). As a result, the present embodiment can prevent the floor panel region including the floor tunnel 14 from being deformed due to the side impact load offset in the vehicle front-rear direction.

Further, in the present embodiment, load transmission efficiency is improved for a side impact load (including an offset side impact load), so that arranging multiple floor cross members 16 on one side is not necessary, and it is sufficient to provide a single floor cross member 16 on the one side. Accordingly, the present embodiment achieves reducing the lower vehicle-body in weight, improves energy efficiency, and increases a leg room for occupants.

What is claimed is:

1. A lower vehicle-body structure, comprising:
    a floor cross member coupling a side sill disposed on an outer side in a vehicle width direction of a vehicle body to a floor tunnel disposed in a center in the vehicle width direction of the vehicle body, and disposed so as to be held between seat brackets in a vehicle front-rear direction; and
    a tunnel reinforcing member provided in the floor tunnel, wherein
    the tunnel reinforcing member includes a first tunnel reinforcing member disposed at a position to overlap in the vehicle front-rear direction with the floor cross member, and second tunnel reinforcing members disposed at positions to overlap in the vehicle width direction at least partly with the seat bracket,
    the seat brackets include seat brackets adjacent to the floor tunnel and seat brackets adjacent to the side sill, and the seat brackets adjacent to the floor tunnel are coupled to the floor cross member,
    the first tunnel reinforcing member is coupled to the floor cross member via the floor tunnel,
    the floor tunnel has tunnel side walls facing the side sill, and a tunnel upper wall connecting upper ends of the tunnel side walls,
    the seat brackets adjacent to the floor tunnel include front seat brackets disposed forward of the floor cross member in the vehicle front-rear direction, and rear seat brackets disposed rearward of the floor cross member in the vehicle front-rear direction, each of the front seat brackets and the rear seat brackets including a seat bracket disposed on each side of the tunnel in the vehicle width direction, and the front seat brackets are coupled to the second tunnel reinforcing members, which extend in the vehicle front-rear direction across the tunnel side walls and the tunnel upper wall,
    the floor cross member has an upper wall to form an upper surface thereof, a front wall on a front side thereof in the vehicle front-rear direction, and a rear wall on a rear side thereof in the vehicle front-rear direction,
    the front seat brackets each have a first flange coupled to the front wall and the rear seat brackets each have a first flange coupled to the rear wall of the floor cross member, and each of the front seat brackets and the rear seat brackets have a second flange coupled to the upper wall, and a third flange positioned on an inner side in the vehicle width direction with respect to the second flange, and
    the third flange has at least a portion thereof coupled to the first tunnel reinforcing member via the floor tunnel.

2. The lower vehicle-body structure according to claim 1, wherein the second flanges respectively positioned on a front side and a rear side in the vehicle front-rear direction of the seat brackets are disposed apart from each other in the vehicle front-rear direction and have inclined portions which are more inclined in the vehicle front-rear direction toward the floor tunnel.

3. A lower vehicle-body structure, comprising:
    a floor cross member coupling a side sill disposed on an outer side in a vehicle width direction of a vehicle body to a floor tunnel disposed in a center in the vehicle width direction of the vehicle body, and disposed so as to be held between seat brackets in a vehicle front-rear direction; and
    a tunnel reinforcing member provided in the floor tunnel, wherein
    the tunnel reinforcing member includes a first tunnel reinforcing member disposed at a position to overlap in the vehicle front-rear direction with the floor cross member, and second tunnel reinforcing members disposed at positions to overlap in the vehicle width direction at least partly with the seat brackets, the seat brackets are coupled to the floor cross member, the first tunnel reinforcing member is coupled to the floor cross member via the floor tunnel, and the floor cross member is disposed at a position to at least partly overlap in the vehicle front-rear direction with a front end in the vehicle front-rear direction of a center pillar.

4. The lower vehicle-body structure according to claim 3, wherein an outer end in the vehicle width direction of the floor cross member is provided with a widened portion having a wider width in the vehicle front-rear direction toward an outer side in the vehicle width direction, and a front end in the vehicle front-rear direction of the widened portion, which is coupled to the side sill, is disposed forward with respect to the center pillar.

5. The lower vehicle-body structure according to claim 3, wherein the floor tunnel has tunnel side walls facing the side sill, and a tunnel upper wall connecting upper ends of the tunnel side walls, and the seat brackets include front seat brackets disposed forward of the floor cross member in the vehicle front-rear direction, the front seat brackets including a seat bracket disposed on each side of the tunnel in the vehicle width direction, and the front seat brackets are coupled to the second tunnel reinforcing members, which extend in the vehicle front-rear direction across the tunnel side walls and the tunnel upper wall.

6. The lower vehicle-body structure according to claim 5, wherein the floor cross member has an upper wall to form an upper surface thereof, a front wall on a front side thereof in the vehicle front-rear direction, and a rear wall on a rear side thereof in the vehicle front-rear direction, the seat brackets each have a first flange coupled to one of the front wall and the rear wall of the floor cross member, a second flange coupled to the upper wall, and a third flange positioned on an inner side in the vehicle width direction with respect to the second flange, and the third flange has at least a portion thereof coupled to the first tunnel reinforcing member via the floor tunnel.

7. The lower vehicle-body structure according to claim 6, wherein the second flanges respectively positioned on a front side and a rear side in the vehicle front-rear direction of the seat brackets are disposed apart from each other in the vehicle front-rear direction and have inclined portions which are more inclined in the vehicle front-rear direction toward the floor tunnel.

* * * * *